(12) United States Patent
Viola et al.

(10) Patent No.: US 6,938,313 B2
(45) Date of Patent: Sep. 6, 2005

(54) PORTABLE PLASTIC PIPE CUTTER BEVELLER SYSTEM

(76) Inventors: Daniel Viola, 3324 - 117 Street, Edmonton, Alberta (CA), T6J 3J4; Randy Dodgson, 24065 Kennedy Road, RR1, Sutton, Ontario (CA), L0E 1R0; David de Sylva, 1151 Denison Street, Unit 18, Markham, Ontario (CA), L3R 3Y4

( * ) Notice: Subject to any disclaimer, the term of this patent is extended or adjusted under 35 U.S.C. 154(b) by 210 days.

(21) Appl. No.: 10/631,759

(22) Filed: Aug. 1, 2003

(65) Prior Publication Data

US 2005/0022353 A1 Feb. 3, 2005

(51) Int. Cl.[7] .............................. B23P 23/00; B23B 5/16; B23C 3/18; B23C 3/04
(52) U.S. Cl. ........................ 29/33 T; 29/27 C; 82/113; 82/101; 30/94; 30/102; 83/54; 451/69; 451/397
(58) Field of Search ............................... 29/33 T, 27 C, 29/27 R, 564, 56.5, 33 D; 82/113, 101, 128; 30/93–94, 102; 451/69, 397, 398, 413; 409/138, 178–179, 201; 83/54

(56) References Cited

U.S. PATENT DOCUMENTS

| | | | | |
|---|---|---|---|---|
| 1,745,699 A | * | 2/1930 | Kleeb et al. ................... 82/101 |
| 2,903,934 A | * | 9/1959 | Montgolf et al. ............. 82/101 |
| 3,187,738 A | * | 6/1965 | Christopher .................. 82/113 |
| 3,292,468 A | * | 12/1966 | Orthey ......................... 82/101 |
| 3,572,199 A | * | 3/1971 | Harden ......................... 82/101 |
| 3,605,530 A | * | 9/1971 | Doty ............................ 82/113 |
| 3,850,058 A | * | 11/1974 | Bachmann .................... 82/101 |
| 3,942,248 A | | 3/1976 | Sherer et al. |
| 4,345,745 A | | 8/1982 | Steele |
| 4,412,401 A | * | 11/1983 | Fundell ........................ 82/113 |
| 4,682,919 A | | 7/1987 | Mitchell |
| 5,148,587 A | * | 9/1992 | Phelps et al. ................ 29/33 T |
| 5,884,379 A | * | 3/1999 | Lombardi .................... 29/33 T |
| 5,894,772 A | | 4/1999 | Nodar |
| 6,079,302 A | | 6/2000 | Gudleske |
| 6,101,910 A | * | 8/2000 | Nicolai et al. ................. 82/101 |
| 6,199,462 B1 | * | 3/2001 | Hallett ......................... 82/113 |
| 6,578,267 B2 | | 6/2003 | Seyfer |

* cited by examiner

Primary Examiner—Erica Cadugan
(74) Attorney, Agent, or Firm—Eugene J. A. Gierczak

(57) ABSTRACT

A pipe-cutting device comprising a portable support; a device for rotating said pipe relative the support; a cutter associated with said support for cutting the pipe during rotation of the pipe.

14 Claims, 7 Drawing Sheets

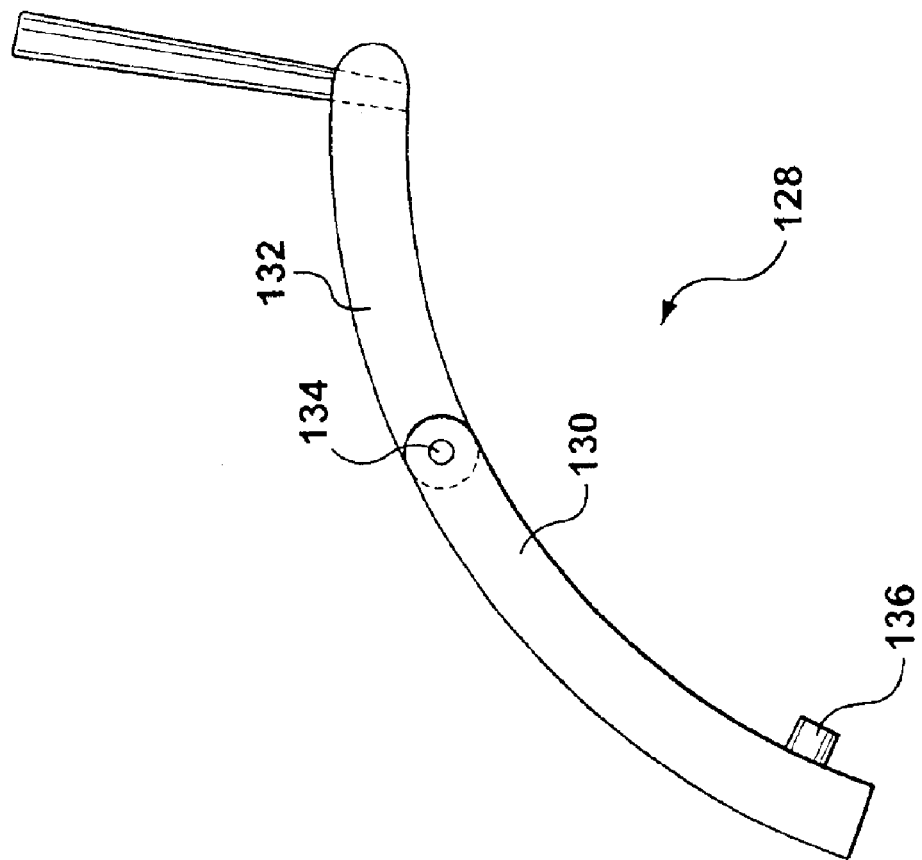

PORTABLE PLASTIC PIPE CUTTER BEVELLER SYSTEM

FIELD OF INVENTION

This invention relates to a pipe-cutting device, and particularly relates to a portable device for cutting plastic pipes and beveling the ends thereof in the field. The invention also relates to a method of cutting and beveling plastic pipes in the field.

BACKGROUND TO THE INVENTION

Various pipes are required to be installed including pipes disposed below ground. Invariably, some of the pipe sections need to be cut to size before joining abutting ends. Such pipes can comprise of a variety of materials, including metal, steel, copper, plastic or the like. Various underground water and sewer pipes are comprised of PVC pipe which also need to be cut in the field.

Traditionally, when the pipe sections are cut in the field, it is not generally convenient to utilize electrical power which may not be available. Accordingly, it is not uncommon that portable saws which are powered by gasoline engines are utilized. In many cases, any portable gas saws utilize carbide blades which are relatively difficult to utilize and accordingly the ends of the cut plastic pipes are not accurate and tend to wander. Furthermore, the user of the portable gasoline engine saws must hold the saw steady so as to prevent any potential kickback, which can be a serious safety hazard.

Furthermore, in order to easily insert the cut ends of a plastic pipe into an abutting pipe, it is desirable that the cut end be beveled for ease of insertion.

Various devices have heretofore been constructed to cut a pipe to length and to bevel the end. For example, U.S. Pat. No. 4,682,919 relates to a portable powered machine for cutting and beveling large diameter pipes of various compositions. Furthermore, U. S. Pat. No. 5,894,772 relates to a portable pipe machine tool, while U.S. Pat. No. 6,578,267 relates to an air tool for sectioning a length of tubing.

Moreover, U.S. Pat. No. 4,345,745 relates to a pipe cutter for forming ends cut in a pipe, while U.S. Pat. No. 6,079,302 illustrates a saw for simultaneously cutting and beveling.

Finally, U.S. Pat. No. 3,942,248 relates to a pipe-cutting device comprising a split frame which may be clamped around the circumference of a pipe.

These and other prior devices are relatively complicated and difficult to use.

Accordingly, it is an object of this invention to provide an improved portable pipe-cutting device which is capable of beveling the ends thereof. It is another object of this invention to provide a method of cutting pipe sections to size which is easier to use.

Finally, it is an object of this invention to provide a portable device which may be used in the field.

It is an aspect of this invention to provide a pipe-cutting device comprising a portable support, structure for rotating the pipe relative the support, a cutter associated with the support for cutting the pipe during rotation of the pipe.

It is another aspect of this invention to provide a pipe-cutting device having a substantially horizontal table for supporting the pipe, a saw disposed above the table for cutting the pipe, a frame connected to and disposed above the table, the frame including pressure wheels, drive wheels disposed below the table, and structure for circumferentially clamping the pipe, which structure is disposed between the pressure wheels and the drive wheels, and which structure is adapted to be rotably driven by the drive wheels so as to cut the pipe with the saw during rotation of the pipe.

It is another aspect of this invention to provide a method of cutting a plastic pipe in the field with a portable device having a table, a frame connected to the table, the frame having moveable pressure wheels, and the table having drive wheels comprising the steps of: placing the pipe through the frame onto the table, securing a collar to the pipe, moving the pressure wheels against the collar so that the collar bears against the drive wheels, engaging the drive wheels to rotate the collar and the pipe, moving a saw disposed above the table against the pipe so as to cut the pipe when the pipe rotates, and beveling the end of a cut end of the pipe with a router.

These and other objects and features of the invention shall now be described in relation to the following drawings.

DESCRIPTION OF THE DRAWINGS

FIG. 5 is a side elevational view of the wrench.

FIG. 6 is an end view of the wrench.

DESCRIPTION OF THE INVENTION

Like parts have like numbers throughout the figures.

Figure 1:
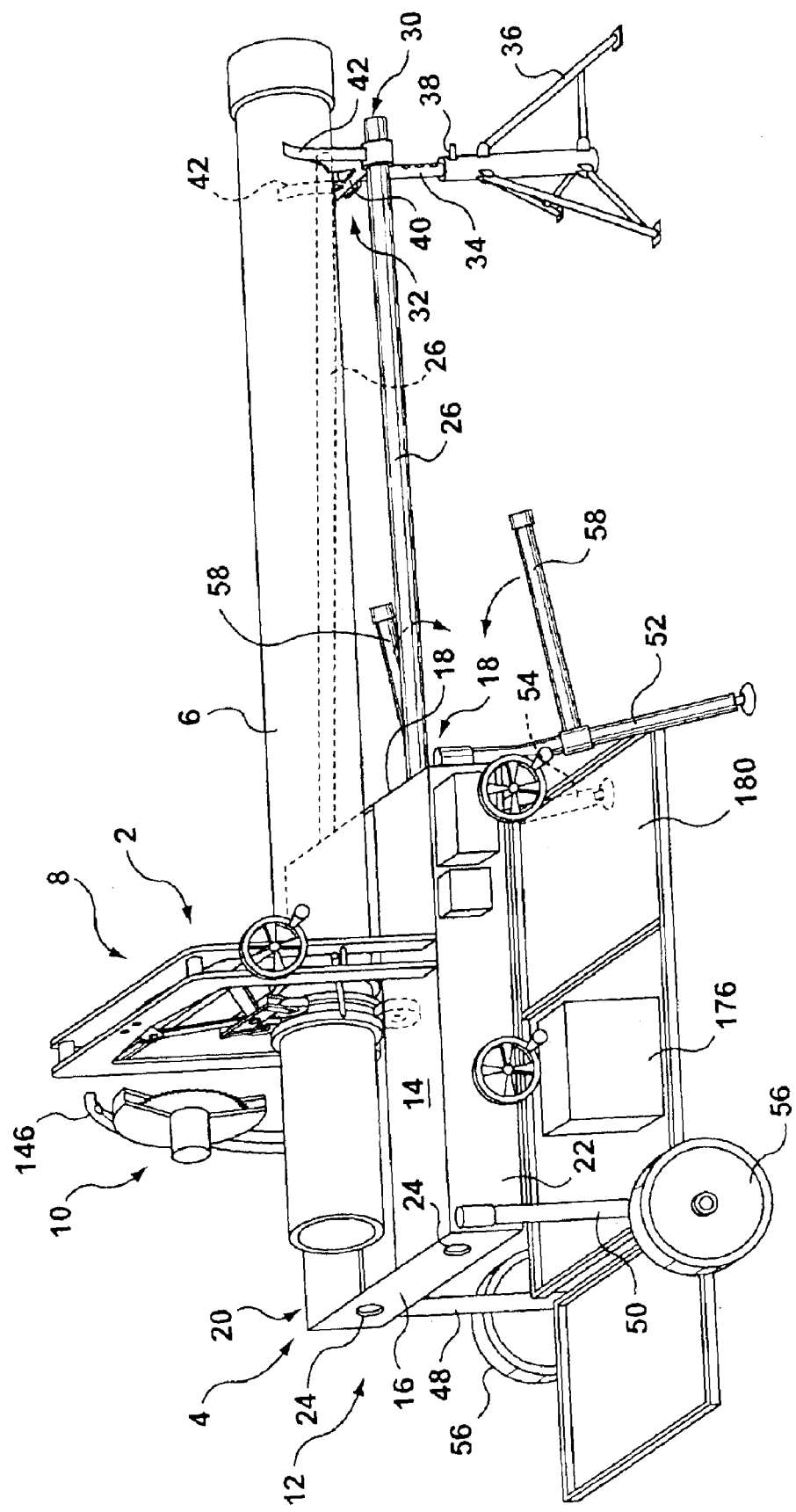
FIG. 1 is a general perspective view of the pipe-cutting device.

FIG. 1 illustrates the pipe-cutting device 2 which includes a support 4 for supporting the pipe 6, means 8 for rotating the pipe 6 relative to the support 4 and a cutter 10 associated with the support 4 for cutting the pipe 6 during rotation of the pipe 6.

Figure 8:
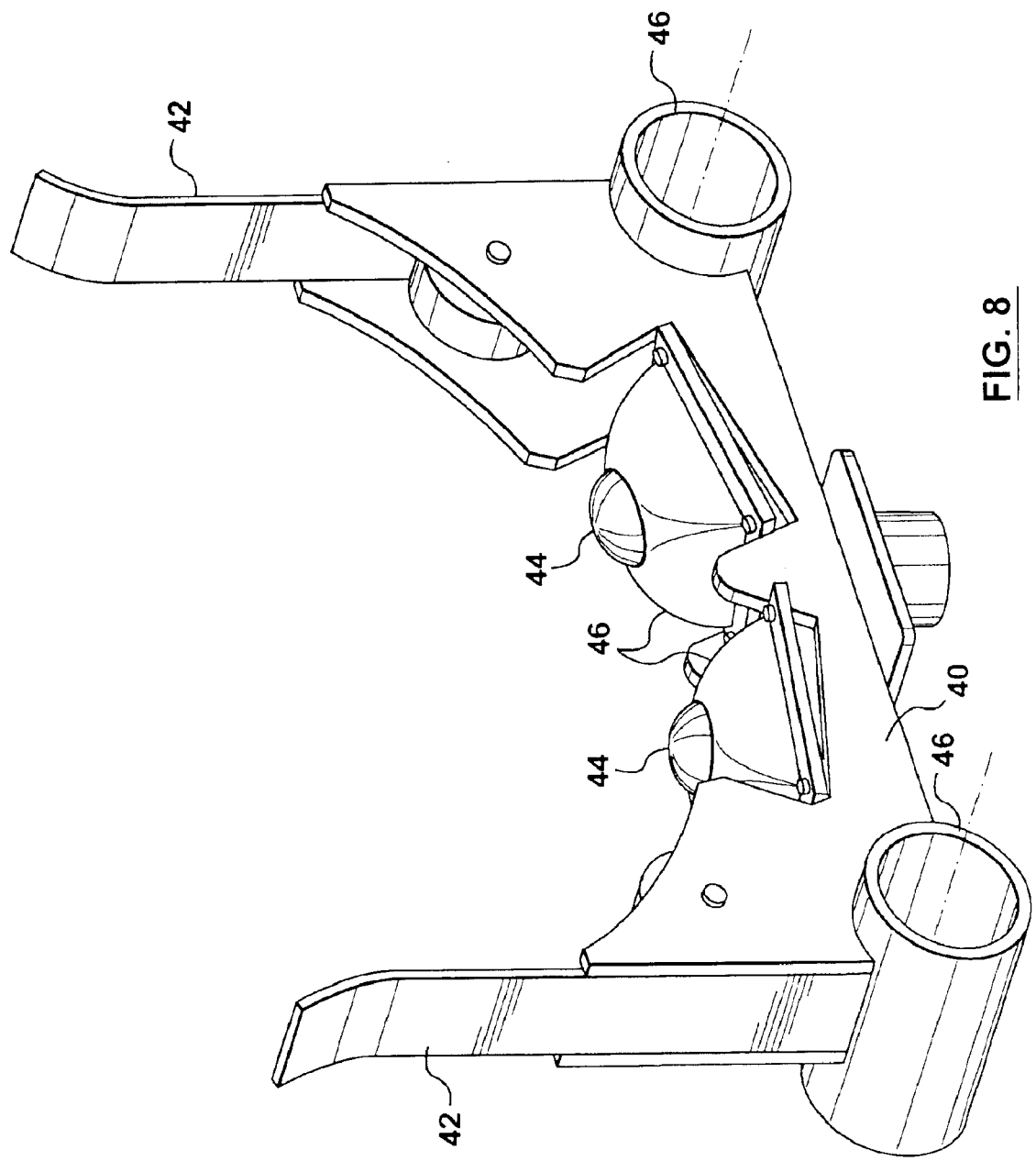
FIG. 8 is a perspective view of the self-leveling pad.

In particular, the support 4 consists of a table 12 which has a top 14 ends 16 and 18 and sides 20 and 22. The ends 16 and 18 include a pair of guide holes 24, each of which are adapted to receive guide extensions 26 which are disposed generally horizontally as best seen in FIG. 1. More specifically, one end 28 of each of the guide extensions 26 are adapted to be received by the guide holes 24, while another end 30 are adapted to rest on a self-leveling pad 32 as best seen in FIG. 1 and FIG. 8.

The self-leveling pad 32 includes a vertical extension 34 which can be adjusted in height by telescopingly moving the extension 34 relative to the pad legs. 36 and clamping it in position by clamping means 38. The upper end of the vertical extension 34 includes a substantially horizontal bar 40 presenting a pair of spaced apart arms 42 which are adapted to retain the pipe 6 there between.

The horizontal bar 40 includes a pair of ball transfer wheels 44 which are retained for multi-directional rotation within sockets 46. The ball transfer wheels can comprise of a variety of materials and in one embodiment include stainless steel balls which can rotate in any direction within the sockets 46.

Accordingly, when placing a long section of pipe 6 onto the top 14 of the table 12, the self-leveling pad 32 is placed a suitable distance away from the holes 24 and then the guide extensions 26 are placed such that one end 28 is disposed within the hole 24 while the other end 30 is disposed within the respective pad holes 46. Thereafter, the pipe 6 is placed on top of the ball transfers 44 and slid onto the table top 14.

FIG. 1 also shows vertical legs 48, 50, 52 and 54.

The bottom of legs 48 and 50 include wheels 56, while legs 52 and 54 include handles 58 which permit the device to be lifted by handles 58 and pushed so as to rotate about the wheels 56 to a desired location, much like that of a wheelbarrow. The handles 58 may also swing in a direction shown so as to be out of the way.

The top surface 14 includes a frame 16 which is connected to and disposed above the top surface 14. The frame includes a top 62 two spaced sides 64 and displaceable pressure means 66. The displacement pressure means 66 includes scissor mechanism 68 which carries pressure wheels 70.

Figure 4:
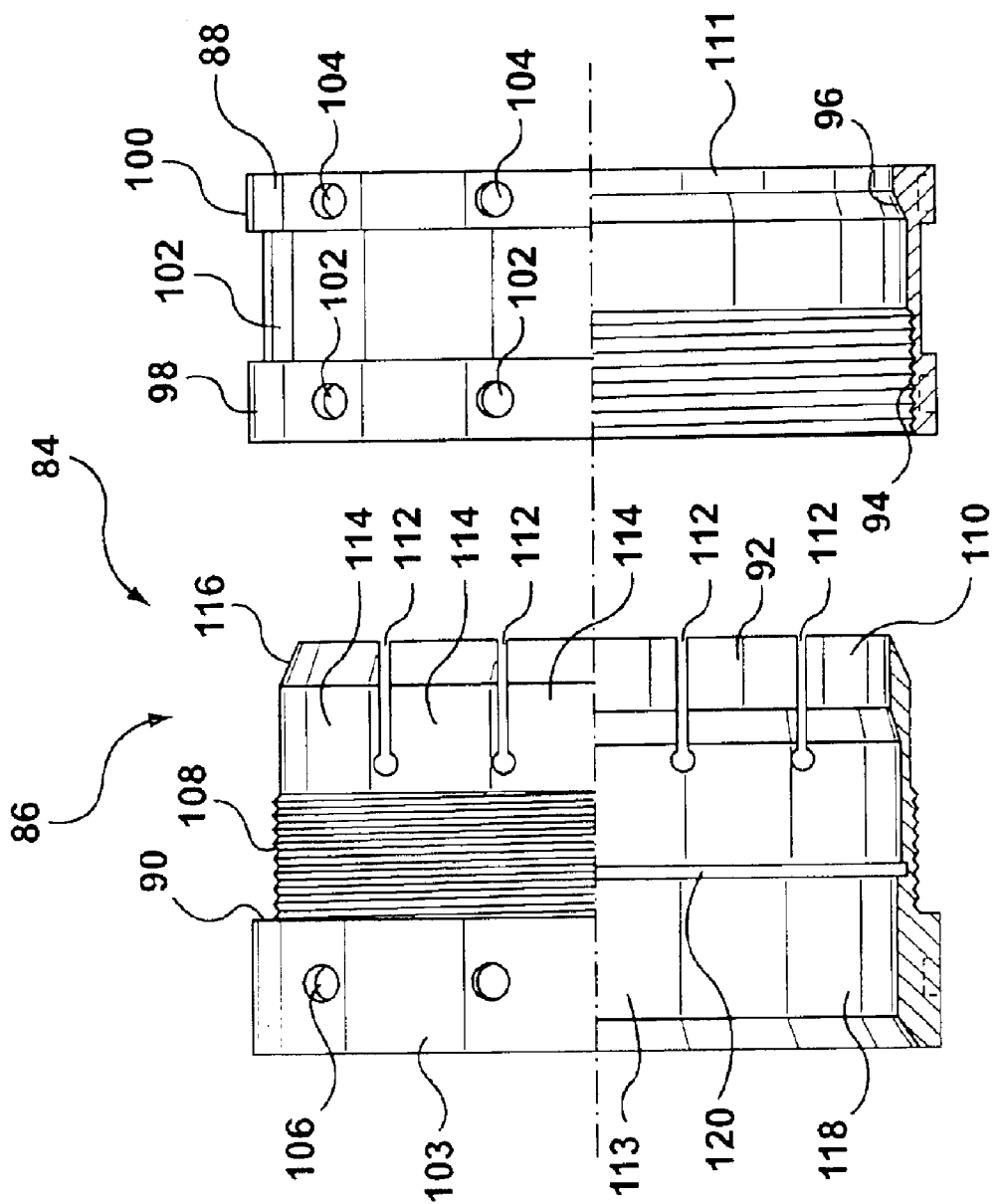
FIG. 4 is a partial cross-sectional view of the first and second collars.

More specifically, the scissor mechanism 68 consists of a first pair of scissor arms 72 and a second pair of scissor arms 74 which articulate or pivot at pivot points 76. The first scissor arms also pivot about pivot points 78 as shown. Moreover, a threaded rod engages the first and second scissor arms 72 and 74 as shown adjacent the pivot point 76 so that when the handle 82 is rotated, the scissor mechanism 78 extends either up or down. The second pair of scissor arms 74 include the pressure wheels 70 which are adapted to bear against collar means 84 as best illustrated in FIG. 4. The collar means 84 define means 86 for circumferentially clamping the pipe 6. More specifically the means 84 and 86 include a first collar 88 for receiving the pipe 6 therethrough and a second collar 90 also receiving the pipe 6 therethrough. The second collar 90 is adapted for threadable engagement with the first collar 88 and includes tapered fingers 92 for grasping and clamping the outer circumference of the pipe 6.

More specifically, the inner bore of the first collar includes threads 94 and a tapered surface 96. The outer surface of the first collar includes two spaced cylindrical surfaces 98 and 100 which have a plurality of spaced apart holes 102 and 104 respectively thereabouts. The first collar 88 also includes a second cylindrical surface 102.

The second collar 90 also includes a cylindrical surface 103 having a plurality of spaced apart holes 106 thereabouts. The second collar 90 also includes an exterior threaded portion 108 and a second cylindrical portion 110 which is adapted to fit within the bore 111 of the first collar 88. The second cylindrical portion 110 of the second collar 90 has a plurality of slots 112 to define a plurality of fingers 114. The second cylindrical portion 110 includes a tapered or beveled end 116 which is adapted to bear against the tapered surface 96 of the first collar 88 when the second collar 90 is threadily engaged with the first collar 88. Accordingly, each of the fingers 114 are tapered at 116.

The inner bore 113 of the second collar 90 includes an annular recess 120 which assists in the flexing or grabbing nature of the fingers 114.

Accordingly, when the pipe 6 is inserted into the first and second collar 88 and 90 respectively, the collars are rotated relative one another in a manner whereby the tapered surface 116 rides up against the tapered surface 96 of the first collar 88 thereby causing the fingers 114 to be displaced radially inwardly and thereby grasp or clamp the outer surface of the pipe 6. The frame 16 can include a suitable hole 122 which is adapted to receive a shaft 124 having one end 126 adapted to be received within one of the holes 102 or 104 of the first collar to prevent the rotation thereof when threadably engaging the second collar 90 to the first collar 88.

A wrench 128 as shown in FIGS. 5 and 6 can be used to tighten the second collar 90 relative to the first collar 88 so as to clamp the pipe 6. More specifically, the wrench includes a first wrench section 130 and a second wrench section 132 which pivot about pin 134. One end of the wrench 128 includes an engaging projection 136 which is adapted to engage one of the holes 106 of the second collar 90 so as to assist in tightening the second collar 90 relative to the first collar 88.

Once the collar means 84 or circumferential clamping means 86 are tightened around the pipe 6, the collar means 84 are placed in aligned fashion in the frame 60 whereby the pressure wheels 70 are retained between the cylindrical surfaces 98 and 100 of the first collar 88 and rest against the second cylindrical surface 102 of a first collar 88.

The support 4 includes under the top surface 14 a motor 138 which is connected to at least one drive wheel 140. The second idler wheel 142 may also be utilized. The wheels 140 and 142 have a knurled or geared surface which is adapted to contact the second cylindrical surface 102 of first collar 88.

Accordingly, once the collar means 84 are tightened on the outer surface of pipe 6 and placed within the frame 60 so that the second cylindrical surface 102 is aligned with the pressure wheels 70 as well as the drive and driven wheels 140 and 142. Thereafter, the scissor mechanism 68 is moved by rotating the handle 82 and thereby move the pressure wheels 70 against the collar means so as to engage the collar means 84 against the driven wheel 140. Thereafter, the variable speed motor 38 is turned on which causes the driven wheel 140 to rotate thereby rotating the collar means 84. It should be apparent that the shaft 104 will be pulled away from the collar means out through the hole 122 so as to permit free rotation of the collar means 84.

A cutter 10 is then also turned on so as to start the cutter saw 144. The cutter saw 144 has a handle 146 so as to pull the cutter saw 144 into engagement with the outer surface of the rotating pipe 6 to thereby cut the end of the pipe to a desired end.

The desired size of the pipe is accomplished by measuring the length of the pipe that is desired to be cut and placing the collar means 84 in the appropriate spot.

Figure 2:
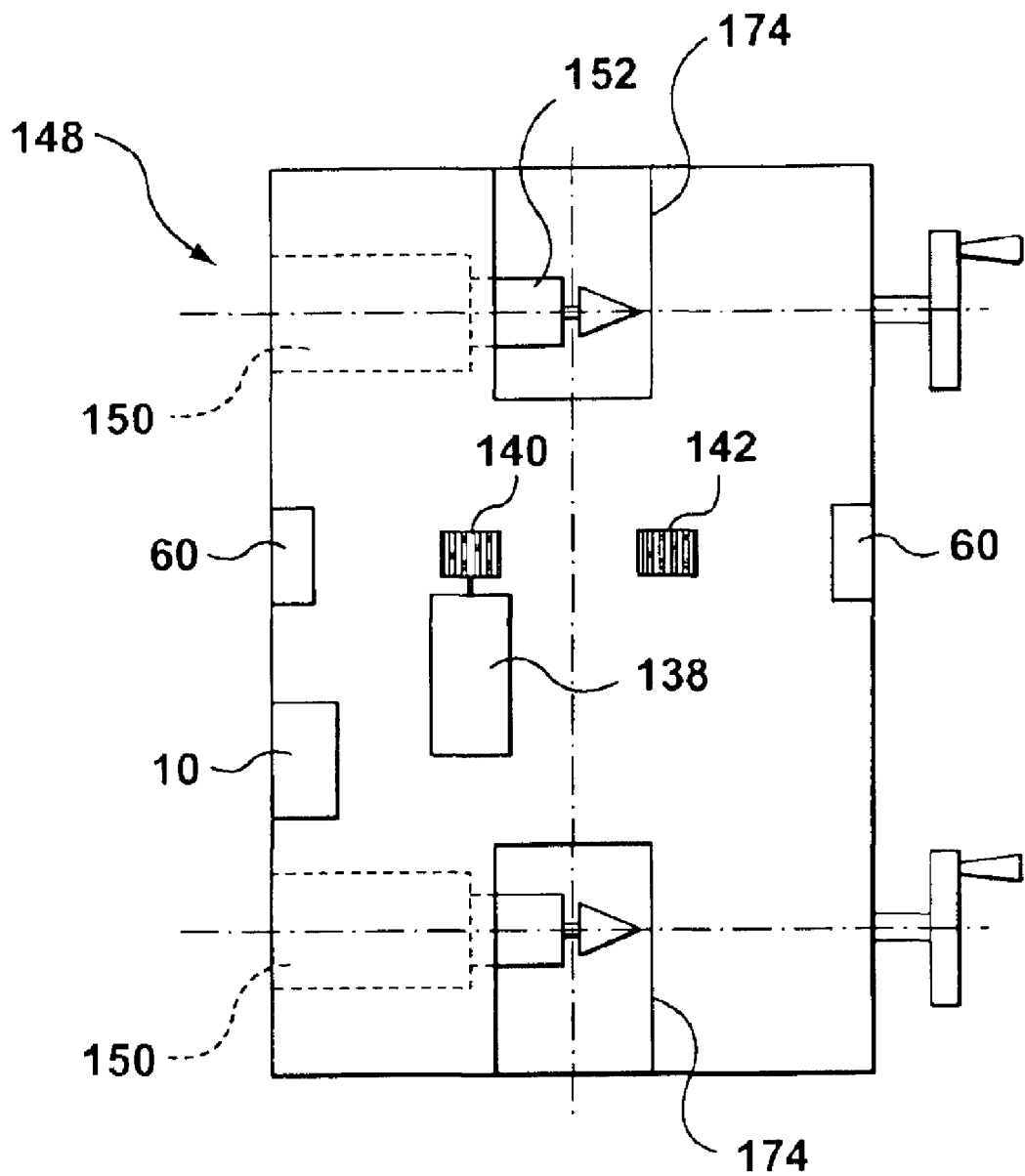
FIG. 2 is a schematic representative top plan view just below the table top.
Figure 3:
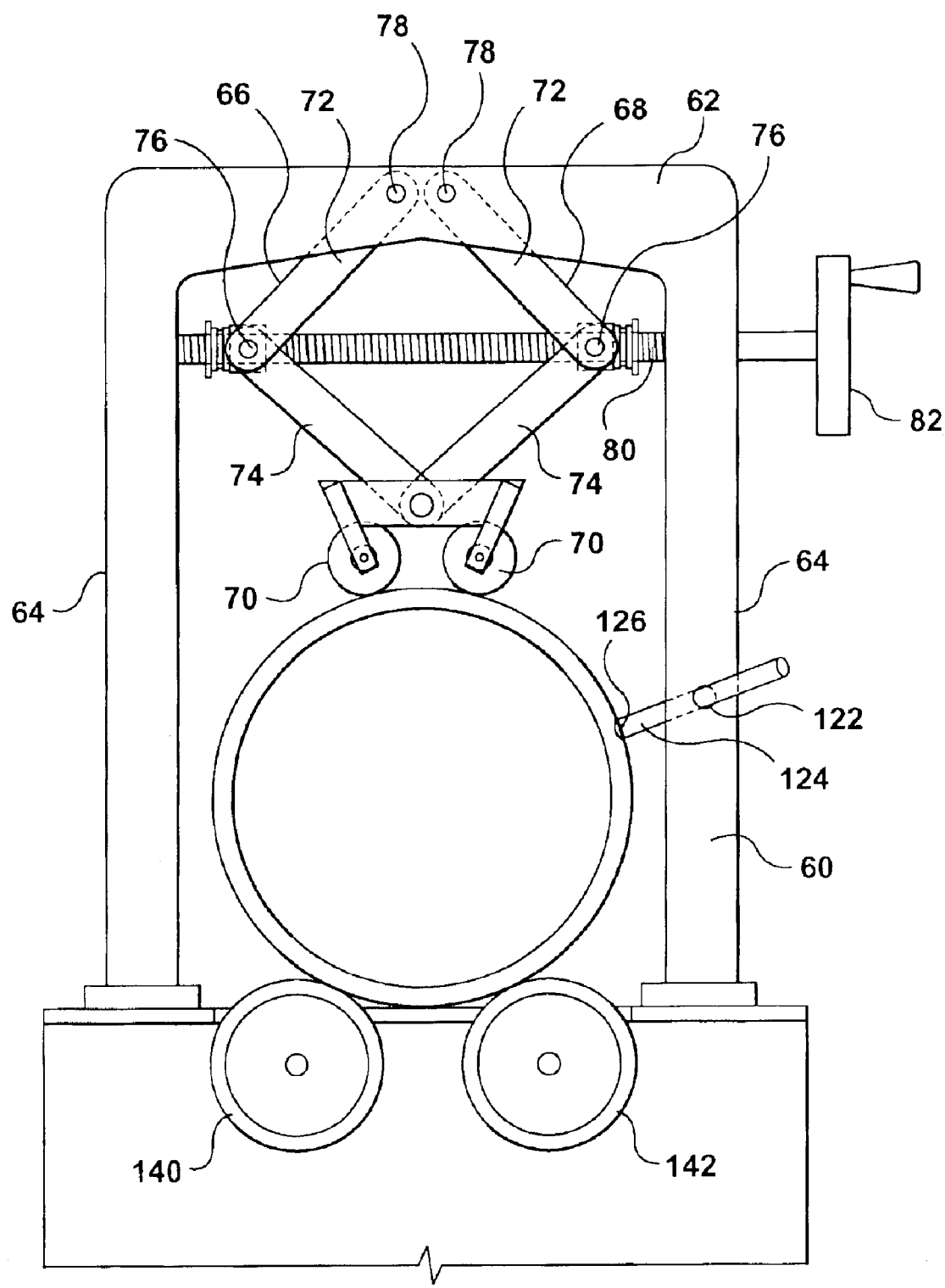
FIG. 3 is a side elevational view of the frame.
Figure 7:
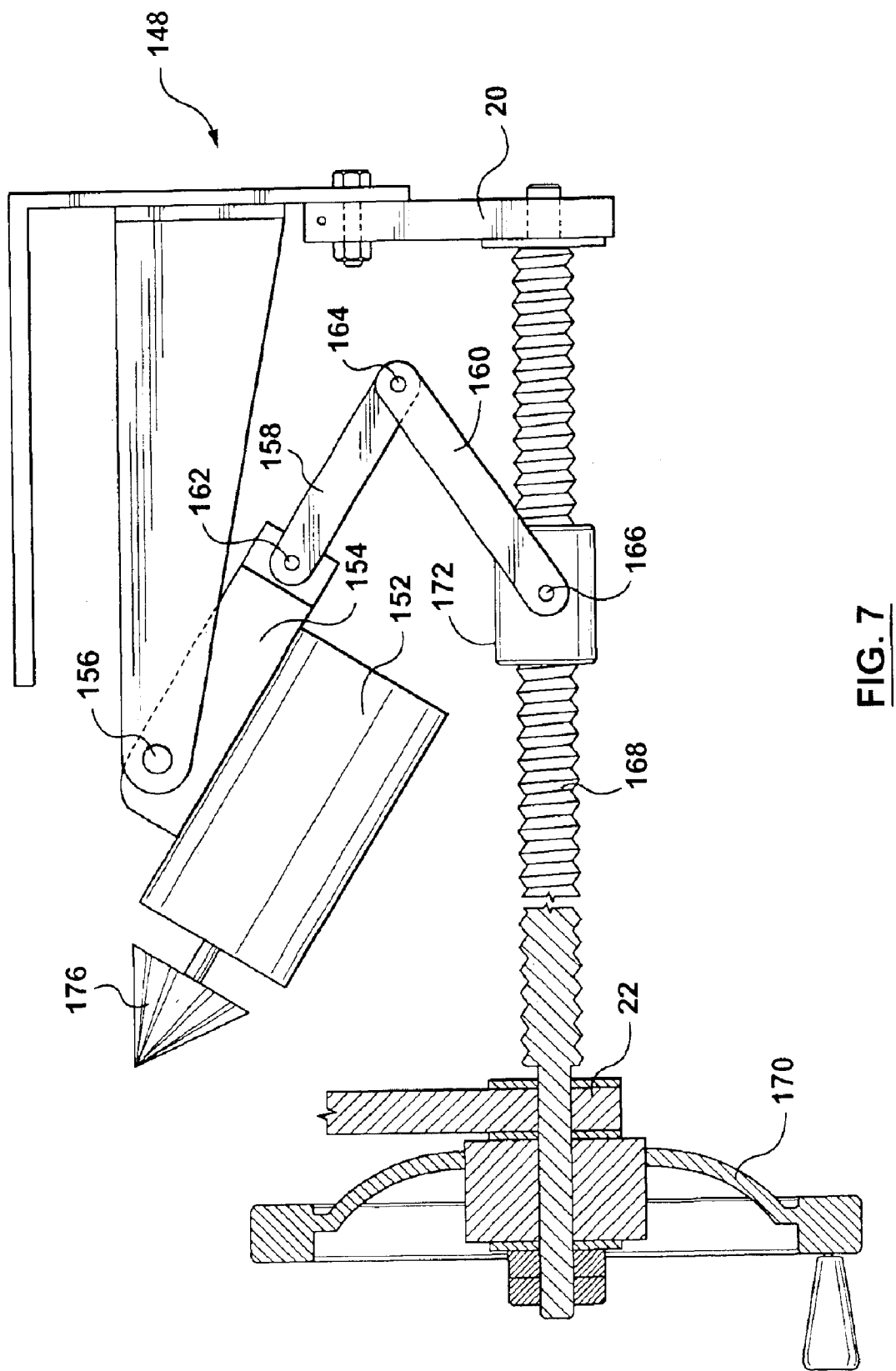
FIG. 7 is a side representative view of the router.

Thereafter, the cut end of the pipe may be beveled by the bevel means 148 best illustrated in FIGS. 2 and 7. The bevel means 148 include a bevel support bracket 148 which is suitably attached to the side 22 at one end and includes a router 152 connected at the other end thereof. The router is connected to a router base 154 which pivots above pin 156 at one end.

The other end of the router base 154 is connected to a first and second articulating arm 158 and 160 which articulate or pivot above pins 162, 164 and 166. A threaded rod 168 extends from one side wall 20 to the second side wall 22 to terminate at a handle 170. The threaded rod 168 includes a threaded support sleeve 172 which is pivotly engaged to the second articulating arm 160. Accordingly, by rotating the handle 170 the threaded rod 168 rotates causing the threaded sleeve 172 to move along the threaded rod 168 thereby causing the router 152 to pivot about pivot point 156 and thereby raised or lowered relative to the top surface 14. The top surface 14 has suitable slots or openings 174. The router 172 includes a router bit 176 which is adapted to bevel the end of the pipe that has been cut. The router 152 is placed in such a manner that the router bit 176 will be in substantially the right position once raised to bevel the end of the cut pipe. In other words, the router is generally disposed within the table or support 4 and out of the way so as to prevent the pipe to be cut in the manner as described above. One the pipe is cut, then the handle 170 can be rotated to raise the router and the router bit 176 in engagement with the end of the cut pipe so as to bevel same.

Moreover, since the motor 138 is a variable drive motor, a suitable speed can be selected to prevent beveling.

The device 2 can include a generator 176 so as to provide power to the device 2 when a device is out in the field and away from out sources.

The device to describe herein provides a relatively portable device which can be easily moved to a desired location by lifting on the arms 58 and pushing or pulling the device around the wheels 56 to any desired location. Thereafter, the device can be assembled as described with the guide extensions 26 and self-leveling pad 32. Thereafter, the pipe 6 can be cut to a desired size by placing the collar means 84 around the pipe and squeezing the collar means 84 against the drive wheel 140 by splicing the pressure wheels 70. The variable speed motor 138 can then be turned on so as to rotate the pipe 6 and the handle 146 moved to bring the cutter saw 144 against the circumference of the pipe 6 and cut same as the pipe is rotated. Thereafter, the power to the saw 144 can be shut off and the power to the router 152 be turned on so as to bevel the end of the cut end of the pipe.

FIG. 2 illustrates that two routers can be used at either ends 16 or 18 of the support 4.

Moreover, the device 2 can include a lower surface 180 which can be adapted to retain a plurality of different sizes of collar means 84 to accommodate different size diameters of pipes.

The device 2 can be comprised of a variety of materials, including metal or the like, but in the preferred embodiment consists of aluminum which is lightweight and adds to the portability of the device. Furthermore, the device 2 can be used to cut pipes of a variety of materials, including metal, but in a preferred embodiment consists of cutting PVC pipes adapted to being disposed into the ground.

We claim:

1. A pipe-cutting device comprising:
   (a) a portable support;
   (b) means for rotating said pipe relative said support;
   (c) a cutter associated with said support for cutting said pipe during rotation of said pipe;
   (d) means for bevelling a cut end of said pipe;
   (e) collar means for clamping said pipe, wherein said collar means comprises:
       (i) first and second collars each adapted to receive said pipe;
       (ii) said second collar rotatably displaceable relative said first collar so as to capture said pipe within said first and second collar.

2. A pipe-cutting device as claimed in claim 1 wherein said rotating means comprises at least one drive wheel rotatably engageable with said collar means for rotating said pipe.

3. A pipe-cutting device as claimed in claim 2, including a frame disposed above said support.

4. A pipe-cutting device as claimed in claim 3, wherein said frame includes displaceable pressure means for pressuring said collar means against said at least one drive wheel for rotating said pipe.

5. A pipe-cutting device as claimed in claim 4, wherein said bevelling means includes a router selectably displaceable relative said support for bevelling the cut end of said pipe.

6. A pipe-cutting device comprising:
   (a) a substantially horizontal table for supporting said pipe;
   (b) a saw disposed above said table for cutting said pipe;
   (c) a frame connected to and disposed above said table, said frame including pressure wheels;
   (d) drive means disposed below said table;
   (e) means for circumferentially clamping said pipe, said clamping means:
       (i) disposed between said pressure wheels and said drive means;
       (ii) adapted to be rotatably driven by said drive means so as to cut said pipe with said saw during rotation of said pipe.

7. A pipe-cutting device as claimed in claim 6, wherein said frame includes means for moving said pressure wheels relative said circumferential clamping means so as to move said clamping means in engagement with said drive means.

8. A pipe-cutting device as claimed in claim 7, wherein said drive means includes a knurled drive wheel.

9. A pipe-cutting device as claimed in claim 8, wherein said clamping means includes:
   (a) a first collar for receiving said pipe;
   (b) a second collar for receiving said pipe, said second collar adapted for threadable engagement with said first collar, and said second collar includes tapered fingers for clamping said pipe.

10. A pipe-cutting device as claimed in claim 9, wherein said frame includes scissor means carrying said pressure wheels.

11. A pipe-cutting device as claimed in claim 10, wherein said drive means comprise a variable speed motor.

12. A pipe-cutting device as claimed in claim 11, wherein said drive means includes a generator permitting movement of said device into the field.

13. A pipe-cutting device as claimed in claim 12, including a router disposed below said table for bevelling the end of a cut end of said pipe.

14. A pipe-cutting device as claimed in claim 13, wherein said router is moveable relative said table.

* * * * *